(12) United States Patent
Alkalay et al.

(10) Patent No.: US 12,405,733 B2
(45) Date of Patent: Sep. 2, 2025

(54) POWER CONSUMPTION REDUCTION IN STORAGE SYSTEM

(71) Applicant: Dell Products L.P., Round Rock, TX (US)

(72) Inventors: Amitai Alkalay, Kadima (IL); Lior Kamran, Richon LeZion (IL); Aric Hadav, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 55 days.

(21) Appl. No.: 18/237,553

(22) Filed: Aug. 24, 2023

(65) Prior Publication Data

US 2025/0068338 A1 Feb. 27, 2025

(51) Int. Cl.
*G06F 3/06* (2006.01)

(52) U.S. Cl.
CPC .......... *G06F 3/0625* (2013.01); *G06F 3/0653* (2013.01); *G06F 3/0689* (2013.01)

(58) Field of Classification Search
CPC ..... G06F 3/0653; G06F 3/0625; G06F 3/0689
USPC ....................................................... 711/101
See application file for complete search history.

(56) References Cited

U.S. PATENT DOCUMENTS

| | | | |
|---|---|---|---|
| 11,023,147 B2 | 6/2021 | Shang et al. | |
| 11,343,282 B2 | 5/2022 | Bett et al. | |
| 11,402,998 B2 | 8/2022 | Dalmatov et al. | |
| 11,436,138 B2 | 9/2022 | Kamran et al. | |
| 11,442,633 B2 | 9/2022 | Kang et al. | |
| 11,513,684 B1 | 11/2022 | Tylik et al. | |
| 11,556,260 B2 | 1/2023 | Han et al. | |
| 11,579,984 B2 | 2/2023 | Murti et al. | |
| 11,625,291 B2 | 4/2023 | Freeman et al. | |
| 11,687,245 B2 | 6/2023 | Schveidel et al. | |
| 2002/0199129 A1* | 12/2002 | Bohrer | G06F 3/0689 714/6.32 |
| 2018/0260162 A1* | 9/2018 | Xiao | G06F 11/3034 |

* cited by examiner

*Primary Examiner* — Hua J Song
(74) *Attorney, Agent, or Firm* — BainwoodHuang (57) ABSTRACT

Techniques for reducing power consumption in a storage system that includes a disk array enclosure (DAE). The techniques include selecting a number of active drives for inclusion in an active drive subgroup of the DAE, and designating a number of inactive (OFF or non-operational) drives for inclusion in an inactive drive subgroup of the DAE. The total number of drives included in the DAE equals the sum of the number of active drives and the number of inactive drives. The techniques further include monitoring at least one condition (e.g., storage capacity utilization, drive wear-leveling, system performance) pertaining to a power consumption of the storage system, and reducing the power consumption by dynamically adapting the number of active drives in the active drive subgroup based on the monitored condition. By dynamically adapting the number of active drives based on certain storage system conditions, significant reductions in power consumption can be achieved.

15 Claims, 4 Drawing Sheets

POWER CONSUMPTION REDUCTION IN STORAGE SYSTEM

BACKGROUND

Storage systems include processing circuitry and arrays of storage devices (or "storage arrays") such as solid-state drives (SSDs) and/or hard disk drives (HDDs). The processing circuitry performs storage input/output (IO) operations (e.g., read operations, write operations) in response to storage IO requests (e.g., read requests, write requests) from storage clients communicably coupled to the storage systems. The storage IO operations cause data blocks, data files, data pages, or other data elements specified in the storage IO requests to be read from or written to volumes, logical units, filesystems, data slices, or other storage objects maintained on the storage devices. The storage arrays may be housed in one or more disk array enclosures (DAE(s)). Each DAE houses, in a single enclosure, multiple drives such as SSDs and/or HDDs. Each storage array may be configured as a redundant array of independent disks (RAID) array, with user data and parity data distributed (or "striped") across multiple drives of the RAID array.

SUMMARY

In a disk array enclosure (DAE) that includes "N" drives, each drive can be divided into multiple data slices (or "slices"), each of which can have a fixed size of four (4) gigabytes (Gb) or any other suitable size. Further, a plurality of slices from any combination of the N drives can form a RAID slice (or "uber"), which can have a fixed size of sixty-four (64) Gb or any other suitable size for storing user data. For example, each uber may be created on a subset of the N drives configured as a RAID-6 array, in which the user data (D) are striped across 4 of the N drives and parity data (P) are striped across two (2) of the N drives. As such, each of the 4D+2P drives of the RAID-6 array can be divided to include 4 slices for storing 16 Gb (4×4 Gb) of the uber's user data or parity data. The number of drives of a RAID array used to stripe an uber's user data and parity data is referred to herein as the RAID width.

For a typical storage system, the number of drives housed in a DAE can be significantly larger than the RAID width. For example, in the above-described DAE that includes N drives, the number "N" may correspond to up to forty (40) or up to one hundred (100) drives, while the RAID width may be five (5) (4D+1P), six (6) (4D+2P), seventeen (17) (16D+1P), eighteen (18) (16D+2P), or any other suitable RAID width, in accordance with a desired RAID scheme. Unfortunately, however, because ubers striped across drives of a RAID array can be formed by slices from any combination of drives of a DAE, all drives of the DAE can, at times, be active (readable, writable) even when storage capacity utilization is low, resulting in undesirable and inefficient power consumption of the storage system. For example, a single drive (e.g., SSD) of a DAE may have an idle power consumption of up to 9 watts (W), which may result in a total power consumption of up to 360 W for 40 drives, or up to 900 W for 100 drives, while all the drives are in an idle state.

Techniques are disclosed herein for reducing power consumption in a storage system that includes a disk array enclosure (DAE). The disclosed techniques can be used to reduce power consumption by dynamically adapting the number of active (readable, writable) drives of a DAE based on monitoring certain storage system conditions or metrics, such as storage capacity utilization, drive wear-leveling, system performance, and so on. The disclosed techniques can include selecting an initial number of active drives for inclusion in an active drive subgroup of the DAE. The initial number of active drives can equal the RAID width, or the RAID width plus one (1) to provide added support in the event of a possible drive failure. The disclosed techniques can include designating a remaining number of inactive (OFF or non-operational) drives for inclusion in an inactive drive subgroup of the DAE. The total number of drives included in the DAE can equal the sum of the number of drives in the active drive subgroup and the number of drives in the inactive drive subgroup. The disclosed techniques can include monitoring at least one condition or metric pertaining to the power consumption of the storage system (e.g., storage capacity utilization, drive wear-leveling, system performance). The disclosed techniques can include reducing the power consumption by dynamically adapting the number of active drives in the active drive subgroup based on the monitored condition or metric. By dynamically adapting the number of drives in an active drive subgroup of a DAE based on certain storage system conditions or metrics, significant reductions in power consumption can be achieved.

In certain embodiments, a method of reducing power consumption in a storage system includes selecting, from among a plurality of storage drives of a storage system, a first number of storage drives for inclusion in an active drive subgroup, and designating, from among the plurality of storage drives, a second number of storage drives for inclusion in an inactive drive subgroup. A total number of the plurality of storage drives is equal to a sum of the first number of storage drives in the active drive subgroup and the second number of storage drives in the inactive drive subgroup. The method includes monitoring at least one condition or metric pertaining to a power consumption of the storage system, and reducing the power consumption of the storage system by dynamically adapting the first number of storage drives in the active drive subgroup based on the monitored condition.

In certain arrangements, the method includes selecting the first number of storage drives in the active drive subgroup in accordance with a specific redundant array of independent disks (RAID) scheme.

In certain arrangements, the method includes creating one or more RAID slices on the first number of storage drives in the active drive subgroup.

In certain arrangements, the method includes setting each of the second number of storage drives in the inactive drive subgroup to a non-operational state.

In certain arrangements, the method includes periodically monitoring the at least one condition or metric pertaining to the first number of storage drives in the active drive subgroup.

In certain arrangements, the method includes determining that the at least one monitored condition or metric exceeds a predefined threshold.

In certain arrangements, the method includes, in response to the monitored condition or metric exceeding the predefined threshold, waking, from the non-operational state, a storage drive from among the second number of storage drives in the inactive drive subgroup.

In certain arrangements, the method includes increasing the first number of storage drives by integrating the wakened storage drive into the active drive subgroup.

In certain arrangements, the method includes determining that the at least one monitored condition or metric is less than a predefined threshold.

In certain arrangements, the method includes, in response to the monitored condition or metric being less than the predefined threshold, decreasing the first number of storage drives by removing a storage drive from among the first number of storage drives in the active drive subgroup.

In certain embodiments, a system for reducing power consumption in a storage system includes a memory, and processing circuitry configured to execute program instructions out of the memory to select, from among a plurality of storage drives of a storage system, a first number of storage drives for inclusion in an active drive subgroup, and designate, from among the plurality of storage drives, a second number of storage drives for inclusion in an inactive drive subgroup. A total number of the plurality of storage drives is equal to a sum of the first number of storage drives in the active drive subgroup and the second number of storage drives in the inactive drive subgroup. The processing circuitry is configured to execute program instructions out of the memory to monitor at least one condition or metric pertaining to a power consumption of the storage system, and to reduce the power consumption of the storage system by dynamically adapting the first number of storage drives in the active drive subgroup based on the monitored condition.

In certain arrangements, the processing circuitry is configured to execute the program instructions out of the memory to select the first number of storage drives in the active drive subgroup in accordance with a specific redundant array of independent disks (RAID) scheme.

In certain arrangements, the processing circuitry is configured to execute the program instructions out of the memory to create one or more RAID slices on the first number of storage drives in the active drive subgroup.

In certain arrangements, the processing circuitry is configured to execute the program instructions out of the memory to set each of the second number of storage drives in the inactive drive subgroup to a non-operational state.

In certain arrangements, the processing circuitry is configured to execute the program instructions out of the memory to periodically monitor the at least one condition or metric pertaining to the first number of storage drives in the active drive subgroup.

In certain arrangements, the processing circuitry is configured to execute the program instructions out of the memory to determine that the at least one monitored condition or metric exceeds a predefined threshold.

In certain arrangements, the processing circuitry is configured to execute the program instructions out of the memory to, in response to the monitored condition or metric exceeding the predefined threshold, wake, from the non-operational state, a storage drive from among the second number of storage drives in the inactive drive subgroup.

In certain arrangements, the processing circuitry is configured to execute the program instructions out of the memory to increase the first number of storage drives by integrating the wakened storage drive into the active drive subgroup.

In certain arrangements, the processing circuitry is configured to execute the program instructions out of the memory to determine that the at least one monitored condition or metric is less than a predefined threshold, and, in response to the monitored condition or metric being less than the predefined threshold, decrease the first number of storage drives by removing a storage drive from among the first number of storage drives in the active drive subgroup.

In certain embodiments, a computer program product includes a set of non-transitory, computer-readable media having instructions that, when executed by processing circuitry, cause the processing circuitry to perform a method including selecting, from among a plurality of storage drives of a storage system, a first number of storage drives for inclusion in an active drive subgroup, and designating, from among the plurality of storage drives, a second number of storage drives for inclusion in an inactive drive subgroup. A total number of the plurality of storage drives is equal to a sum of the first number of storage drives in the active drive subgroup and the second number of storage drives in the inactive drive subgroup. The method includes monitoring at least one condition or metric pertaining to a power consumption of the storage system, and reducing the power consumption of the storage system by dynamically adapting the first number of storage drives in the active drive subgroup based on the monitored condition.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for reducing power consumption in a storage system that includes a disk array enclosure (DAE). The disclosed techniques can be used to reduce power consumption by dynamically adapting a number of active (readable, writable) drives of the DAE based on monitoring certain storage system conditions or metrics, such as storage capacity utilization, drive wear-leveling, system performance, and so on. The disclosed techniques can include selecting an initial number of active drives for inclusion in an active drive subgroup of the DAE, and designating a remaining number of inactive (OFF or non-operational) drives for inclusion in an inactive drive subgroup of the DAE. The initial number of active drives can equal the RAID width or the RAID width plus one (1). The total number of drives included in the DAE can equal the sum of the number of drives in the active drive subgroup and the number of drives in the inactive drive subgroup. The disclosed techniques can include monitoring at least one condition or metric pertaining to the power consumption of the storage system, and reducing the power consumption by dynamically adapting the number of active drives in the active drive subgroup based on the monitored condition or metric. By dynamically adapting the number of drives in an active drive subgroup of a DAE based on certain storage system conditions or metrics (e.g., storage capacity utilization, drive wear-leveling, system performance), significant reductions in power consumption can be achieved.

Figure 1:
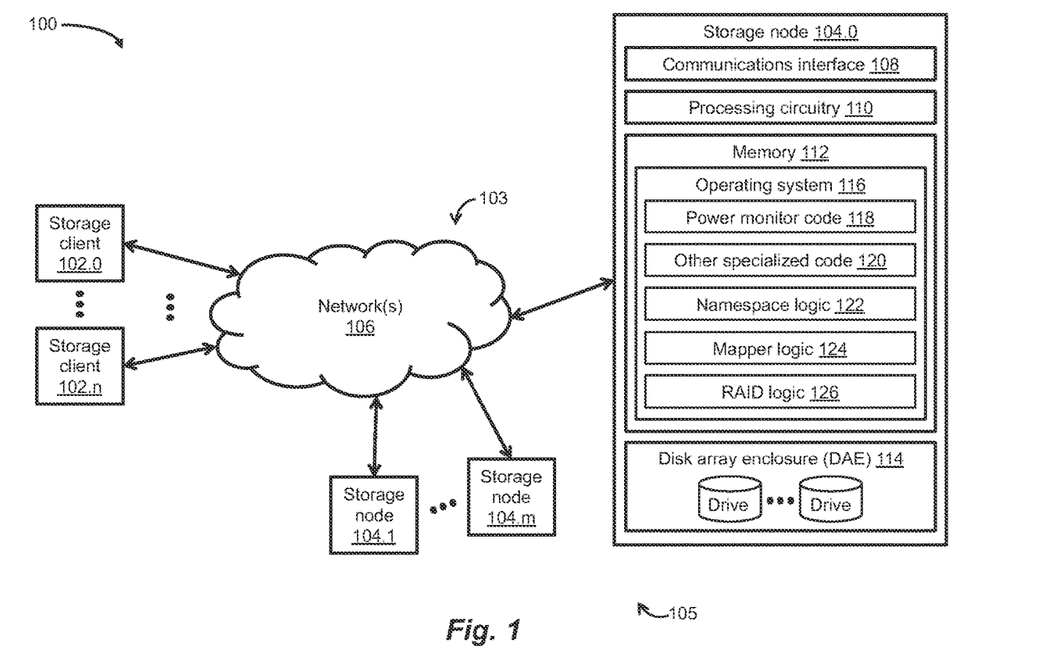
FIG. 1 is a block diagram of an exemplary storage environment, in which techniques can be practiced for reducing power consumption in a storage system that includes a disk array enclosure (DAE)

FIG. 1 depicts an illustrative embodiment of an exemplary storage environment 100, in which techniques can be practiced for reducing power consumption in a storage system that includes a disk array enclosure (DAE). As shown in FIG. 1, the storage environment 100 can include a plurality of storage client computers ("storage client(s)") 102.0, . . . , 102.n communicably coupled to a distributed storage system (DSS) 105 by a communications medium 103, which can include at least one network 106. The DSS 105 can include a plurality of storage nodes 104.0, 104.1, . . . , 104.m. For example, each of the storage clients 102.0, . . . , 102.n may be configured as an email server computer, a file server computer, a web server computer, and/or any other suitable client computer, server computer, or computerized device. Further, the storage clients 102.0, . . . , 102.n may be part of an enterprise computer system, a cloud based computer system, or any other suitable arrangement of storage clients associated with respective users. The storage clients 102.0, . . . , 102.n can be configured to provide, over the network(s) 106, storage input/output (IO) requests (e.g., small computer system interface (SCSI) commands, network file system (NFS) commands) to one or more of the storage nodes 104.0, . . . , 104.m of the DSS 105. In response to the storage IO requests (e.g., read requests, write requests), the storage node(s) 104.0, . . . , 104.m can perform storage IO operations (e.g., read operations, write operations) that cause data blocks, data files, data pages, and/or any other suitable data elements specified in the storage IO requests to be read from or written to volumes, logical units, filesystems, data slices, or any other suitable storage objects maintained on one or more storage drives (or "drives") of a DAE. The storage nodes 104.0, . . . , 104.m can be configured to collectively form the DSS 105, which can have any suitable number (e.g., at least two (2)) or arrangement of storage nodes.

The communications medium 103 can be configured to interconnect the storage clients 102.0, . . . , 102.n with the storage nodes 104.0, . . . , 104.m to enable them to communicate and exchange data and control signaling. As shown in FIG. 1, the communications medium 103 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, or any suitable combination thereof.

FIG. 1 further depicts an exemplary configuration of the storage node 104.0. It is noted that each of the storage nodes 104.1, . . . , 104.m of the DSS 105 can be configured like the storage node 104.0. As shown in FIG. 1, the storage node 104.0 can include a communications interface 108, processing circuitry (e.g., one or more processors) 110, a memory 112, and a disk array enclosure (DAE) 114, which can be configured to house one or more arrays (e.g., RAID arrays) of storage devices such as solid-state drives (SSDs), hard disk drives (HDDs), flash drives, hybrid drives, optical drives, or any other suitable storage drives or devices. The storage drives (or "drives") can be configured to store volumes, logical units, filesystems, data slices, and/or any other suitable storage objects for hosting data storage of client applications (e.g., email applications, file applications, web applications) running on the storage clients 102.0, . . . , 102.n. The communications interface 108 can include an Ethernet interface, an InfiniBand interface, a Fiber Channel interface, and/or any other suitable communications interface, as well as SCSI target adapters, network interface adapters, and/or any other suitable adapters for converting electronic, optical, and/or wireless signals received over the network(s) 106 to a form suitable for use by the processing circuitry 110.

The memory 112 can include persistent memory (e.g., flash memory, magnetic memory) and non-persistent memory (e.g., dynamic random-access memory (DRAM), static random-access memory (SRAM)). Further, the memory 112 can store an operating system (OS) 116 such as a Linux OS, Unix OS, Windows OS, or any other suitable OS, as well as a variety of software constructs realized in the form of code and data, such as power monitor code 118 and other specialized code 120, as well as namespace logic 122, mapper logic 124, and RAID logic 126. The power monitor code 118 can be configured to monitor one or more conditions or metrics pertaining to the power consumption of the storage node 104.0 (e.g., storage capacity utilization, drive wear-leveling, system performance), and the other specialized code 120 can be configured to dynamically adapt the number of active (readable, writable) drives of the DAE 114 based on the monitored condition(s) or metric(s). In one embodiment, the storage node 104.0 can provide RAID-based data storage and access. To that end, the RAID logic 126 can be configured to provide a physical address space to the mapper logic 124. The mapper logic 124 can be configured to manage mappings (e.g., mapped RAID) between logical addresses and physical addresses of the storage node 104.0, and to provide a logical address space to the namespace logic 122. The namespace logic 122 can be configured to receive a storage IO request (e.g., read request, write request) related to data at a logical address of the storage node 104.0, and to send the storage IO request to the mapper logic 124. The mapper logic 124 can be configured to look up a corresponding physical address of the data, and to initiate the storage IO request to the RAID logic 126. The RAID logic 126 can be configured to perform a storage IO operation (e.g., read operation, write operation) involving the data at the physical address of an active drive in a RAID environment of the DAE 114.

In the context of the processing circuitry 110 being configured to execute specialized code and data (e.g., program instructions) out of the memory 112, a computer program product can be configured to deliver all or a portion of the program instructions and/or data to the processing circuitry 110. Such a computer program product can include one or more non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions and/or data for performing, when executed by the processing circuitry 110, the various techniques and/or methods disclosed herein.

Figure 2:
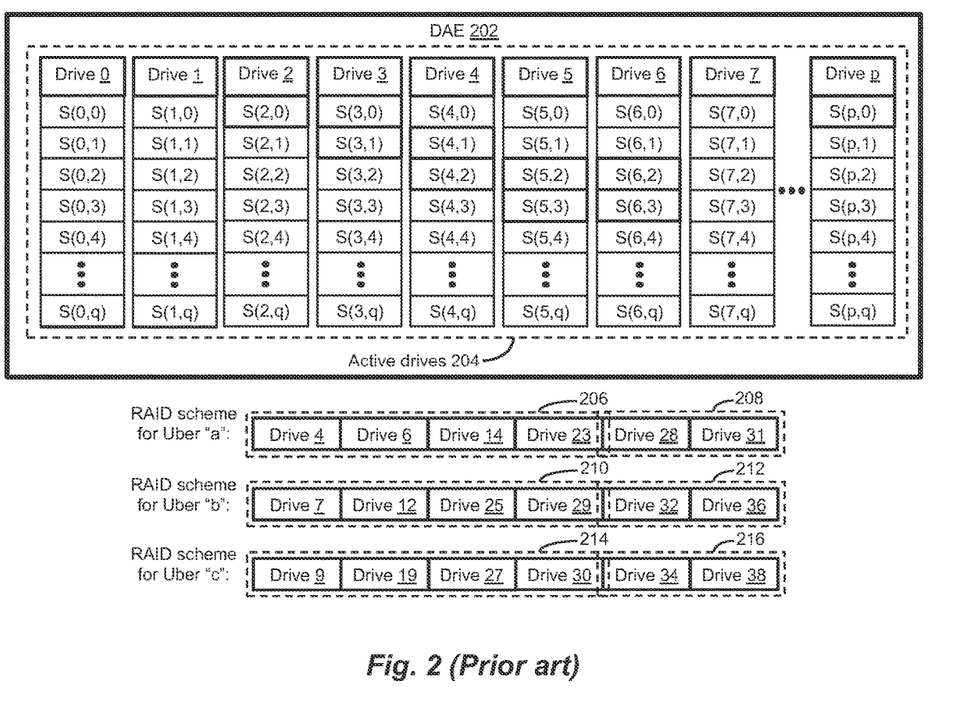
FIG. 2 is a block diagram of a conventional DAE that houses a group of active (readable, writable) drives, as well as possible drives from among the group of active drives for striping user data and parity data of a plurality of exemplary RAID slices (or "ubers")

FIG. 2 depicts a conventional DAE 202 that houses a group of active (readable, writable) drives 204 (i.e., drives 0, 1, . . . , p). For example, the number of drives 0, 1, . . . , p may be equal to up to forty (40) (p=39) or more drives. As shown in FIG. 2, the drive "0" can include a plurality of slices S(0,0), S(0,1), . . . , S(0, q), the drive "1" can include a plurality of slices S(1,0), S(1,1), . . . , S(1, q), and so on, up to the drive "p," which can include a plurality of slices S(p,0), S(p,1), . . . , S(p,q). For example, the number of slices 0, 1, . . . , q included in each of the drives 0, 1, . . . , p may be equal to up to thirty-two (32) (q=31) or more slices. Further, each of the plurality of slices 0, 1, . . . , q included in the drives 0, 1, . . . , p may have a fixed size of four (4) gigabytes (Gb) or any other suitable size. As such, each of the drives 0, 1, . . . , p may store up to 128 Gb (32×4 Gb) or more of user data and/or parity data.

FIG. 2 further depicts possible drives from among the active drives 204 that can be used to stripe user data and/or parity data of a plurality of RAID slices (or "ubers"), such as an exemplary uber "a," an exemplary uber "b," and an exemplary uber "c." For example, each of the ubers a, b, c may have a fixed size for storing up to sixty-four (64) Gb of user data, or any other suitable amount of user data. Further, each of the ubers a, b, c may have a RAID width of five (5) (4D+1P), six (6) (4D+2P), seventeen (17) (16D+1P), eighteen (18) (16D+2P), or any other suitable RAID width.

Accordingly, as shown in FIG. 2, a RAID-6 scheme for the uber "a" can include user data 206 striped across the drive "4," the drive "6," the drive "14," and the drive "23," and double parity data 208 striped across the drive "28" and the drive "31." Further, a RAID-6 scheme for the uber "b" can include user data 210 striped across the drive "7," the drive "12," the drive "25," and the drive "29," and double parity data 212 striped across the drive "32" and the drive "36." In addition, a RAID-6 scheme for the uber "c" can include user data 214 striped across the drive "9," the drive "19," the drive "27," and the drive "30," and double parity data 216 striped across the drive "34" and the drive "38." Because each of the ubers a, b, c may have a fixed size for storing 64 Gb of user data, each drive of the RAID-6 schemes can include 4 slices assigned to one of the ubers a, b, c. As such, each of the ubers a, b, c can be striped across 4 drives for storing up to 64 Gb (4×4×4 Gb) of user data, and across 2 drives for storing up to 32 Gb (2×4×4 Gb) of parity data.

As seen in FIG. 2, the number of drives housed in the conventional DAE 202 can be much larger than the RAID width. For example, the conventional DAE 202 may include 40 drives (p=39), while the RAID width may be 6 (4D+2P). Unfortunately, however, because ubers (e.g., ubers a, b, or c) striped across drives of a RAID-6 array can be formed by slices from any combination of the drives "0" to "39" of the DAE 202, all 40 drives can, at times, be active (readable, writable) even when storage capacity utilization is low, resulting in undesirable and inefficient power consumption of a storage system.

During operation, the techniques disclosed herein can be performed to reduce power consumption in a storage system that includes a disk array enclosure (DAE). The disclosed techniques can be used to reduce power consumption by dynamically adapting the number of active (readable, writable) drives of a DAE based on monitoring certain storage system conditions or metrics, such as storage capacity utilization, drive wear-leveling, system performance, and so on. For example, the disclosed techniques may be performed by some or all of the storage nodes 104.0, . . . , 104.m of the DSS 105, as well as by a standalone storage system with a single storage node or appliance, a clustered storage system with two or more storage nodes or appliances, a cloud-based storage system, or any other suitable storage node, appliance, or system.

Figure 3:
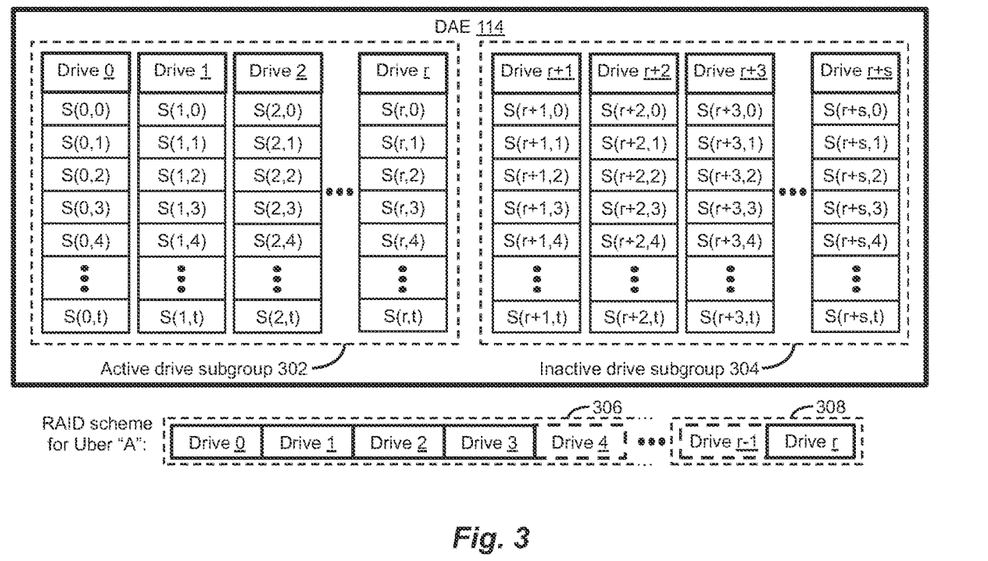
FIG. 3 is a block diagram of an exemplary DAE included in the storage system of FIG. 1, in which the DAE houses a subgroup of active (readable, writable) drives and a subgroup of inactive (OFF or non-operational) drives, as well as possible drives from among the subgroup of active drives for striping user data and parity data of an exemplary RAID slice (or "uber")

The disclosed techniques will be further understood with reference to the following illustrative example and FIGS. 1 and 3. In this example, the disclosed techniques are performed by the storage node 104.0 (see FIG. 1), which includes the DAE 114 (see FIG. 3). As shown in FIG. 3, the DAE 114 can house a group of drives 0, 1, . . . , r, r+1, r+2, . . . , r+s. For example, the number of drives 0, 1, . . . , r+s may be equal to forty (40). As further shown in FIG. 3, the drive "0" can include a plurality of slices S(0,0), S(0,1), . . . , S(0,t), the drive "1" can include a plurality of slices S(1,0), S(1,1), . . . , S(1,t), and so on, up to the drive "r," which can include a plurality of slices S(r,0), S(r,1), . . . , S(r,t). Likewise, the drive "r+1" can include a plurality of slices S(r+1,0), S(r+1,1), . . . , S(r+1,t), the drive "r+2" can include a plurality of slices S(r+2,0), S(r+2,1), . . . , S(r+2,t), and so on, up to the drive "r+s," which can include a plurality of slices S(r+s,0), S(r+s,1), . . . , S(r+s,t). For example, the number of slices 0, 1, . . . , t included in each of the drives 0, 1, . . . , r+s may be equal to up to thirty-two (32) (t=31) slices. Further, each of the slices 0, 1, . . . , t may have a fixed size of 4 Gb. As such, each of the drives 0, 1, . . . , 39 (r+s=39) may store up to 128 Gb (32×4 Gb) of data.

In this example, the power consumption of the storage node 104.0 is reduced by dynamically adapting the number of active drives of the DAE 114 based on monitoring certain storage node conditions or metrics. To that end, the processing circuitry 110 executes the specialized code 120 to select a subgroup of active (readable, writable) drives from among the group of drives 0, 1, . . . , r+s of the DAE 114 (see FIG. 3). In this example, an active drive subgroup 302 is selected that includes the drives 0, 1, . . . , r, in which an initial number of drives in the active drive subgroup 302 is equal to the RAID width. As such, the RAID scheme for an uber "A" (see FIG. 3) can include user data 306 striped across the drives 0, 1, . . . , r−2, and double parity data 308 striped across the drives r−1, r.

It is noted that, for a typical storage system, storage capacity utilization can be relatively low. For example, a median level of storage capacity utilization may be only about 29%, with few systems having a storage capacity utilization greater than 50%. By selecting the active drive subgroup 302 that includes the drives 0, 1, . . . , r from among the group of drives 0, 1, . . . , r+s, the storage capacity utilization of the storage node 104.0 can be increased while significantly reducing its power consumption. In this example, the initial number of drives in the active drive subgroup 302 is selected in accordance with a specific RAID scheme, namely, a RAID-18 scheme. As such, in this example, the initial number of drives in the active drive subgroup 302 is equal to 18 (e.g., RAID width 18) (r=17), in which 16 drives (e.g., drives 0, 1, . . . , r−2; see FIG. 3) are used to stripe the user data, and 2 drives (e.g., drives r−1, r; see FIG. 3) are used to stripe the double parity data. In one embodiment, the initial number of drives in the active drive subgroup 302 can be equal to 19 (e.g., the RAID width 18 plus 1) (r=18) to provide added support in the event of a possible drive failure. In each case, a portion of the storage capacity of the active drives can be kept in reserve for use when required to support a drive failure.

Having selected the drives 0, 1, . . . , r for the active drive subgroup 302, the processing circuitry 110 executes the specialized code 120 to designate a subgroup of inactive (OFF or non-operational) drives. In this example, an inactive drive subgroup 304 is designated that includes the drives r+1, r+2, . . . , r+s, in which the number of drives in the inactive drive subgroup 304 is equal to the difference between the total number of drives housed in the DAE 114 (e.g., 40) and the number of drives in the active drive subgroup 302 (e.g., 19), namely, 40−19=21 (s=21). Once the inactive drive subgroup 304 has been designated, the processing circuitry 110 executes the specialized code 120 to set each of the drives r+1, r+2, . . . , r+s to a non-operational sleep state. For example, each drive in the non-operational sleep state may have a power consumption of about 0.1 watts (W) to 0.2 W. In this example, ubers (e.g., uber "A," see FIG. 3) are created on the drives from the active drive subgroup 302, while no ubers are created on the drives from the inactive drive subgroup 304.

Once the initial number of drives 0, 1, . . . , r have been selected for the active drive subgroup 302 and a remaining number of drives r+1, r+2, . . . , r+s have been designated for the inactive drive subgroup 304, the processing circuitry 110 executes the power monitor code 118 to periodically monitor certain conditions or metrics of the storage node 104.0. In this example, the monitored conditions or metrics include the storage capacity utilization, drive wear-leveling, and system performance.

Regarding the periodic monitoring of the storage capacity utilization, the processing circuitry 110 executes the specialized code 120 to make determinations as to whether the storage capacity utilization of the drives in the active drive subgroup 302 has increased to exceed a predefined threshold percentage, such as 40% or any other suitable percentage. In response to the increase in the storage capacity utilization, the processing circuitry 110 executes the specialized code 120 to wake at least one drive in the inactive drive subgroup 304 from the non-operational sleep state, and to add or integrate the wakened drive into the active drive subgroup 302, while assuring that the ubers are striped across all active drives in a load-balanced manner.

Regarding the periodic monitoring of drive wear-leveling, the processing circuitry 110 executes the specialized code 120 to make determinations as to whether drive wear-leveling measurements have increased to exceed a predefined threshold measurement. For example, an endurance of an SSD may be quantified based on a drive specification known as "drive writes per day" (DWPD). The DWPD specification can provide a measure of the number of times the entire storage capacity of an SSD can be written to (or overwritten) per day over its warranty period, expected lifetime (e.g., 5 years), or other specified time duration. Such an SSD can support a limited number of program/erase (P/E) cycles for each erase block, which can define a DWPD value for a particular workload. The drive wear-leveling measurements for the SSD can be obtained by a calculation that involves periodically dividing the number of "written bytes" by the number of "written bytes allowed" up to the specified time duration, in accordance with the DWPD specification for the SSD. In response to the drive wear-leveling measurements exceeding the predefined threshold measurement for at least a predetermined amount of time, the processing circuitry 110 executes the specialized code 120 to wake at least one drive in the inactive drive subgroup 304 from the non-operational sleep state, and to add or integrate the drive into the active drive subgroup 302, again assuring that the ubers are striped across all active drives in a load-balanced manner.

Regarding the periodic monitoring of system performance, the processing circuitry 110 can execute the specialized code 120 to periodically monitor a latency curve for drives in the active drive subgroup 302 and compare it with a specified latency modeling or benchmark characteristic or threshold for the drives. For example, the latency curve may denote an average latency of storage client IOs, an average mirroring overhead latency, an average mirrored write latency, or any other suitable latency measurement of metric. In response to the latency curve indicating an unacceptable latency increase relative to the specified latency modeling or benchmark characteristic or threshold, the processing circuitry 110 executes the specialized code 120 to wake at least one drive in the inactive drive subgroup 304 from the non-operational sleep state, and to add or integrate the drive into the active drive subgroup 302, again assuring that the ubers are striped across all active drives in a load-balanced manner. In this way, the number of drives in the active drive subgroup 302 can be dynamically increased based on a monitored increase in the storage capacity utilization, drive wear-leveling, or latency.

Figure 4:
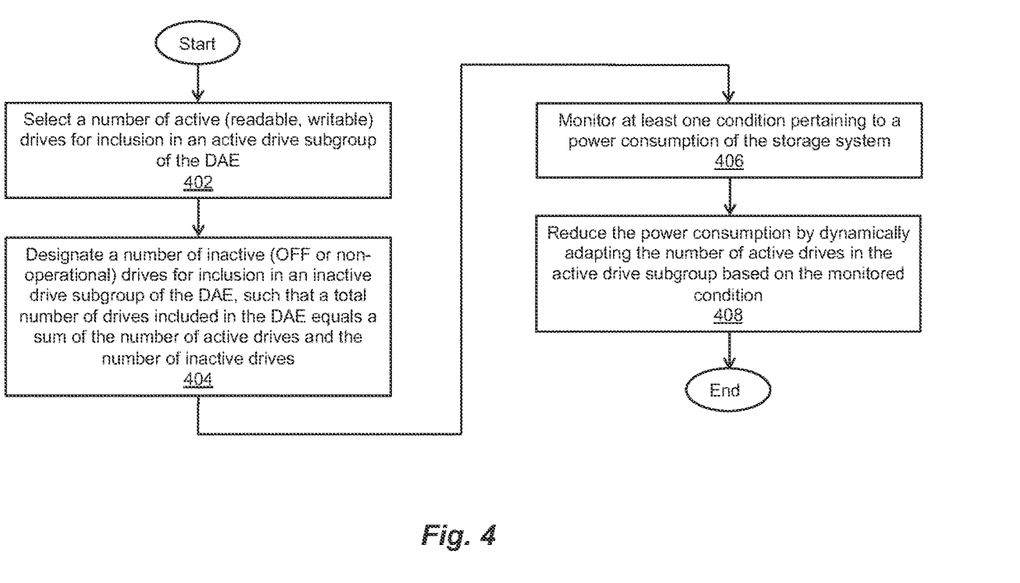
FIG. 4 is a flow diagram of an exemplary method of reducing power consumption in a storage system that includes a DAE.

A method of reducing power consumption in a storage system that includes a disk array enclosure (DAE) is described below with reference to FIG. 4. As depicted in block 402, a number of active (readable, writable) drives are selected for inclusion in an active drive subgroup of the DAE. As depicted in block 404, a number of inactive (OFF or non-operational) drives are designated for inclusion in an inactive drive subgroup of the DAE, such that a total number of drives included in the DAE equals a sum of the number of active drives and the number of inactive drives. As depicted in block 406, at least one condition is monitored pertaining to a power consumption of the storage system. As depicted in block 408, the power consumption is reduced by dynamically adapting the number of active drives in the active drive subgroup based on the monitored condition.

Having described the above illustrative embodiments, various alternative embodiments and/or variations may be made and/or practiced. For example, it was described herein that the drives in the inactive drive subgroup 304 (see FIG. 3) of the DAE 114 can be set to a non-operational sleep state. Alternatively, or in addition, the drives can be set to a completely powered-off state. Further, data blocks stored on such drives can be periodically refreshed based on a minimum retention requirement, which can specify numbers of months and/or days when the drives are to be periodically powered-on. For example, a minimum retention requirement may specify that such drives are to be periodically powered-on every "M" (e.g., M=2) months for "d" (e.g., d=2) days, or any other suitable numbers of months, days, and/or other time periods.

It was further described herein that the active drive subgroup 302 (see FIG. 3) of the DAE 114 can be selected to include an initial number of drives equal to the RAID width (e.g., 16D+2P) or the RAID width plus 1 (e.g., 16D+2P+1). Alternatively, or in addition, a RAID width less than an initial number of drives in the active drive subgroup 302 can be employed in cases where reduced power consumption takes precedence over storage capacity efficiency.

It was further described herein that, regarding the periodic monitoring of storage capacity utilization, one or more drives can be added or integrated into the active drive subgroup 302 (see FIG. 3) based on whether the storage capacity utilization exceeds a predefined threshold percentage, such as 40% or any other suitable percentage. Alternatively, or in addition, one or more drives can be added or integrated into the active drive subgroup 302 in response to an expansion request from the mapper logic 124 (see FIG. 1).

It was further described herein that, in response to a latency curve for the drives in the active drive subgroup 302 (see FIG. 3) being indicative of an unacceptable latency increase relative to a specified latency modeling/benchmark characteristic or threshold, at least one drive in the inactive drive subgroup 304 can be wakened from the non-operational sleep state and added or integrated into the active drive subgroup 302. Alternatively, or in addition, such periodic monitoring of the latency curve can be disabled in cases where reduced power consumption takes precedence over system performance. It is noted that, if the active drive subgroup 302 includes at least about 18 or 19 drives, then the number of drives in the active drive subgroup 302 would likely not be a performance limit.

It was further described herein that the active drive subgroup 302 (see FIG. 3) can be selected to include an initial number of drives, in accordance with a specific RAID scheme. Alternatively, or in addition, other RAID types and/or schemes can be allocated from the drives in the active drive subgroup 302. For example, in a mapped-RAID system, metadata may be stored in mirrored storage (e.g., 2-way or 3-way mirrored storage) of the active drives, and user data may be stored in non-mirrored storage (e.g., RAID-5, RAID-6, RAID-17, RAID-18) of the active drives.

It was further described herein that power consumption in a storage system can be reduced by dynamically adapting the number of active drives of a DAE based on monitoring certain storage system conditions or metrics, such as storage capacity utilization, drive wear-leveling, system performance, and so on. Alternatively, or in addition, in a storage system where ubers are created such that all drives of a DAE can, at times, be active, power consumption can be reduced by concurrently monitoring several storage system conditions or metrics such as storage capacity utilization and drive wear-leveling, and maintaining each such concurrently monitored condition or metric below a respective predefined threshold.

It was further described herein that, in response to an increase in storage capacity utilization, at least one drive from the inactive drive subgroup 304 (see FIG. 3) can be wakened from a non-operational sleep state and added or integrated into the active drive subgroup 302 (see FIG. 3), while assuring that ubers are striped across all the active drives in a load-balanced manner. Alternatively, or in addition, one or more drives can be removed (or evicted) from a group of active drives in a DAE to increase the storage capacity utilization. For example, in a DAE that includes 40 drives, if the storage capacity utilization is found to be less than a predefined threshold of 40%, then 5 of the 40 drives may be removed to increase the storage capacity utilization to 45.7%, which can be determined as follows:

$$40\% \times (40 \div 35) = 45.7\% \quad (1)$$

It is noted, however, that such removal (or eviction) of one or more drives from the DAE can cause unwanted write amplification, due to the need to move data from the drive(s) being removed (or evicted) to one or more remaining drives of the DAE.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of reducing power consumption in a storage system, comprising:
   selecting, from among a plurality of storage drives of a storage system, a first number of storage drives for inclusion in an active drive subgroup;
   designating, from among the plurality of storage drives, a second number of storage drives for inclusion in an inactive drive subgroup, a total number of the plurality of storage drives being equal to a sum of the first number of storage drives in the active drive subgroup and the second number of storage drives in the inactive drive subgroup;
   setting each of the second number of storage drives in the inactive drive subgroup to a non-operational state;
   periodically monitoring at least one condition or metric pertaining to the first number of storage drives in the active drive subgroup;
   determining whether the at least one monitored condition or metric is less than or greater than a predefined threshold;
   in response to the at least one monitored condition or metric being less than the predefined threshold, decreasing the first number of storage drives by removing a storage drive from among the first number of storage drives in the active drive subgroup; and
   in response to the at least one monitored condition or metric being greater than the predefined threshold, waking, from the non-operational state, a storage drive from among the second number of storage drives in the inactive drive subgroup.

2. The method of claim 1 wherein the selecting the first number of storage drives includes selecting the first number of storage drives in the active drive subgroup in accordance with a specific redundant array of independent disks (RAID) scheme.

3. The method of claim 2 further comprising:
   creating one or more RAID slices on the first number of storage drives in the active drive subgroup.

4. The method of claim 1 further comprising:
   increasing the first number of storage drives by integrating the wakened storage drive into the active drive subgroup.

5. The method of claim 1 wherein the periodically monitoring the at least one condition or metric pertaining to the first number of storage drives in the active drive subgroup includes periodically monitoring one of a storage capacity utilization condition or metric, a drive wear-leveling condition or metric, and a system performance condition or metric.

6. A system for reducing power consumption in a storage system, comprising:
   a memory; and
   processing circuitry configured to execute program instructions out of the memory to:
      select, from among a plurality of storage drives of a storage system, a first number of storage drives for inclusion in an active drive subgroup;
      designate, from among the plurality of storage drives, a second number of storage drives for inclusion in an inactive drive subgroup, a total number of the plurality of storage drives being equal to a sum of the first number of storage drives in the active drive subgroup and the second number of storage drives in the inactive drive subgroup;
      set each of the second number of storage drives in the inactive drive subgroup to a non-operational state;
      periodically monitor at least one condition or metric pertaining to the first number of storage drives in the active drive subgroup;
      determine whether the at least one monitored condition or metric is less than or greater than a predefined threshold;
      in response to the at least one monitored condition or metric being less than the predefined threshold, decrease the first number of storage drives by removing a storage drive from among the first number of storage drives in the active drive subgroup; and
      in response to the at least one monitored condition or metric being greater than the predefined threshold, wake, from the non-operational state, a storage drive from among the second number of storage drives in the inactive drive subgroup.

7. The system of claim 6 wherein the processing circuitry is further configured to execute the program instructions out of the memory to select the first number of storage drives in the active drive subgroup in accordance with a specific redundant array of independent disks (RAID) scheme.

8. The system of claim 7 wherein the processing circuitry is further configured to execute the program instructions out of the memory to create one or more RAID slices on the first number of storage drives in the active drive subgroup.

9. The system of claim 6 wherein the processing circuitry is further configured to execute the program instructions out of the memory to increase the first number of storage drives by integrating the wakened storage drive into the active drive subgroup.

10. The system of claim 6 wherein the processing circuitry is further configured to execute the program instructions out of the memory to periodically monitor one of a storage capacity utilization condition or metric, a drive wear-leveling condition or metric, and a system performance condition or metric.

11. A computer program product including a set of non-transitory, computer-readable media having instructions that, when executed by processing circuitry, cause the processing circuitry to perform a method comprising:
   selecting, from among a plurality of storage drives of a storage system, a first number of storage drives for inclusion in an active drive subgroup;
   designating, from among the plurality of storage drives, a second number of storage drives for inclusion in an inactive drive subgroup, a total number of the plurality of storage drives being equal to a sum of the first number of storage drives in the active drive subgroup and the second number of storage drives in the inactive drive subgroup;
   setting each of the second number of storage drives in the inactive drive subgroup to a non-operational state;
   periodically monitoring at least one condition or metric pertaining to the first number of storage drives in the active drive subgroup;
   determining whether the at least one monitored condition or metric is less than or greater than a predefined threshold;

in response to the at least one monitored condition or metric being less than the predefined threshold, decreasing the first number of storage drives by removing a storage drive from among the first number of storage drives in the active drive subgroup; and in response to the at least one monitored condition or metric being greater than the predefined threshold, waking, from the non-operational state, a storage drive from among the second number of storage drives in the inactive drive subgroup.

12. The computer program product of claim 11 wherein the method comprises:
selecting the first number of storage drives in the active drive subgroup in accordance with a specific redundant array of independent disks (RAID) scheme.

13. The computer program product of claim 12 wherein the method comprises:
creating one or more RAID slices on the first number of storage drives in the active drive subgroup.

14. The computer program product of claim 11 wherein the method comprises:
increasing the first number of storage drives by integrating the wakened storage drive into the active drive subgroup.

15. The computer program product of claim 11 wherein the method comprises:
periodically monitoring one of a storage capacity utilization condition or metric, a drive wear-leveling condition or metric, and a system performance condition or metric.

* * * * *